O. H. ENSIGN.
REVERSIBLE INTERNAL COMBUSTION ENGINE.
APPLICATION FILED AUG. 29, 1906.

Witnesses
C. E. Holly
J. Townsend

Inventor
Orville H. Ensign
by James R. Townsend
his atty.

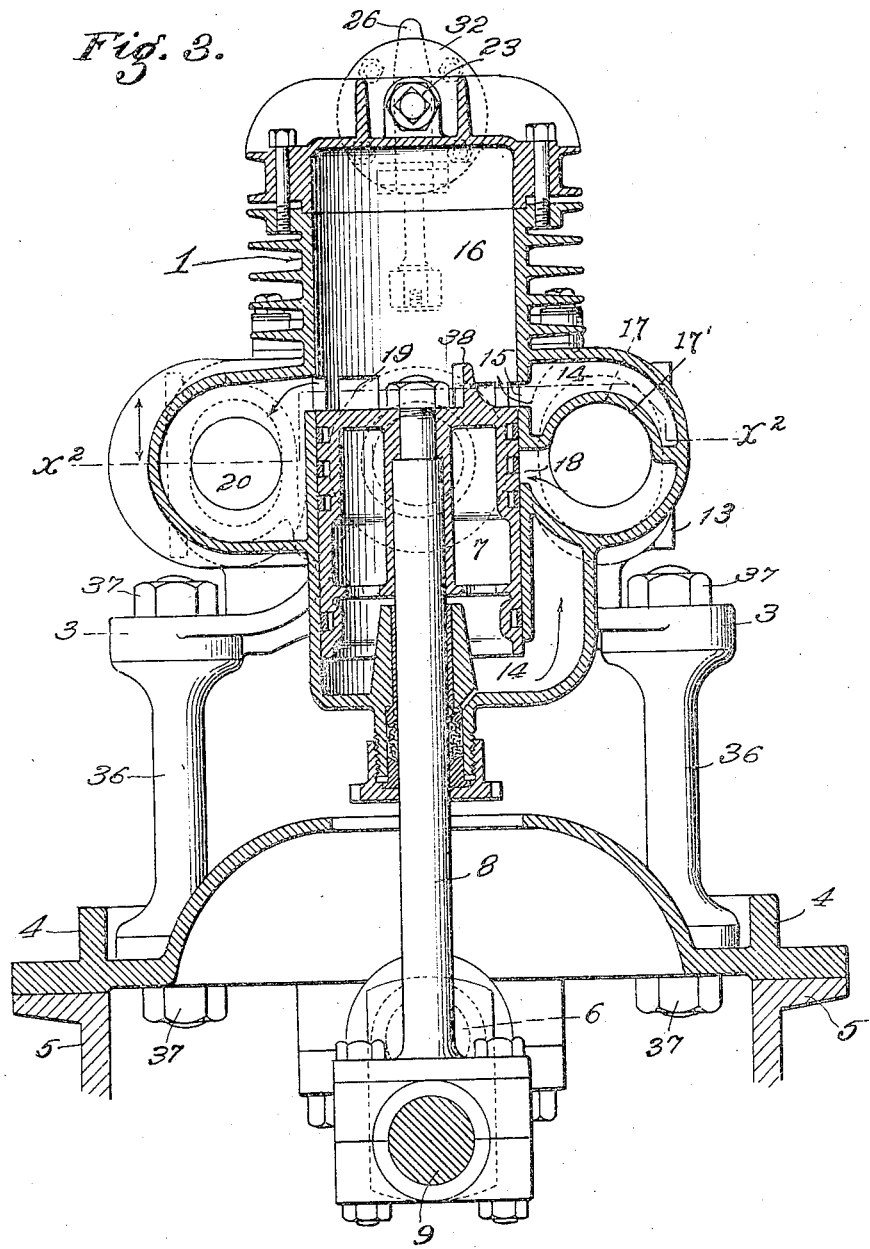

O. H. ENSIGN.
REVERSIBLE INTERNAL COMBUSTION ENGINE.
APPLICATION FILED AUG. 29, 1906.
1,042,540.
Patented Oct. 29, 1912.
3 SHEETS—SHEET 3.
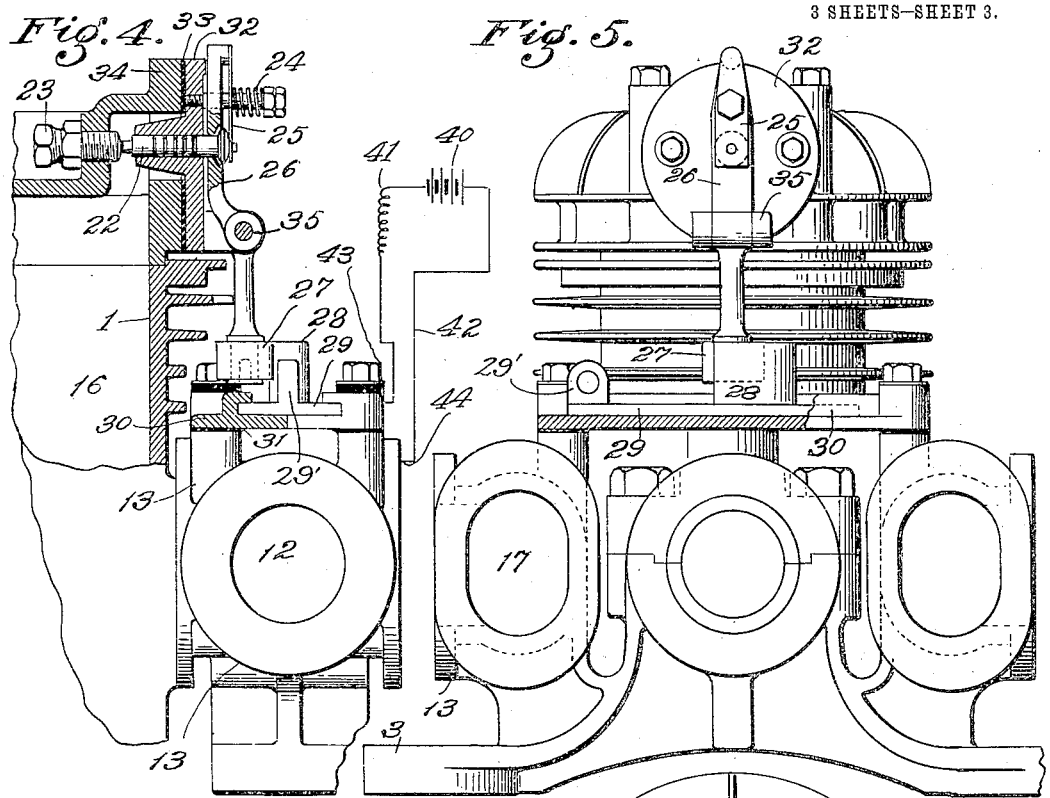
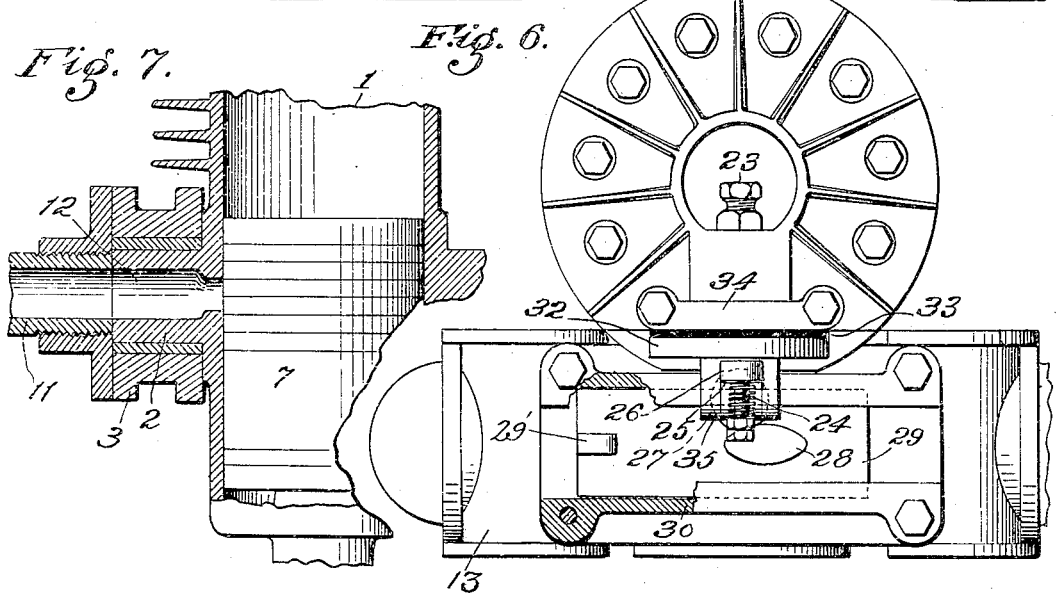
Witnesses
C. C. Holly
J. Townsend.
Inventor
Orville H. Ensign
James R. Townsend
his atty.

UNITED STATES PATENT OFFICE.

ORVILLE H. ENSIGN, OF LOS ANGELES, CALIFORNIA, ASSIGNOR OF ONE-HALF TO PAUL H. BLADES, OF LOS ANGELES, CALIFORNIA.

REVERSIBLE INTERNAL-COMBUSTION ENGINE.

1,042,540.     Specification of Letters Patent.     Patented Oct. 29, 1912.

Application filed August 29, 1906. Serial No. 332,546.

*To all whom it may concern:*

Be it known that I, ORVILLE H. ENSIGN, a citizen of the United States, residing at Los Angeles, in the county of Los Angeles and State of California, have invented a new and useful Reversible Internal - Combustion Engine, of which the following is a specification.

This invention relates to oscillating internal combustion engines.

Objects of this invention are:—(1) to provide an oscillating internal combustion engine of few, light, and simple parts, which can be readily reversed at the will of the operator; (2) to provide a reversible oscillating internal combustion engine without check-valves, cam shafts, gears, or moving cams, and which is operable at variable speeds; and in which the timing of the spark for ignition, and also the reversal of the engine after having once been started in any direction, may be accomplished at will, and the engine started in the reverse direction by simply moving manually - operated parts which are normally stationary, and which do not move in time with, or as a part of any of the automatically-moving parts of the engine; this ignition to be accomplished by what is known as the make-and-break spark; (3) to provide means for varying the timing of the spark and reversing of the engine, taking advantage of the oscillation of the cylinder to accomplish such operation; (4) to provide a reversible, self-starting, variable speed internal combustion two-cycle engine, using the oscillation of the cylinder in connection with normally stationary parts to accomplish the variation of the speed, reversing and starting the engine without the use of a cam shaft or jump sparks; (5) to control the timing of the spark, the reversing of the engine, the stopping of the engine, and the starting of the engine by the movement of a single part which is normally stationary relative to the operating parts of the engine; (6) to produce a reversible high speed multiple cylinder internal combustion engine of minimum number of parts.

The accompanying drawings illustrate the invention.

Figure 1:
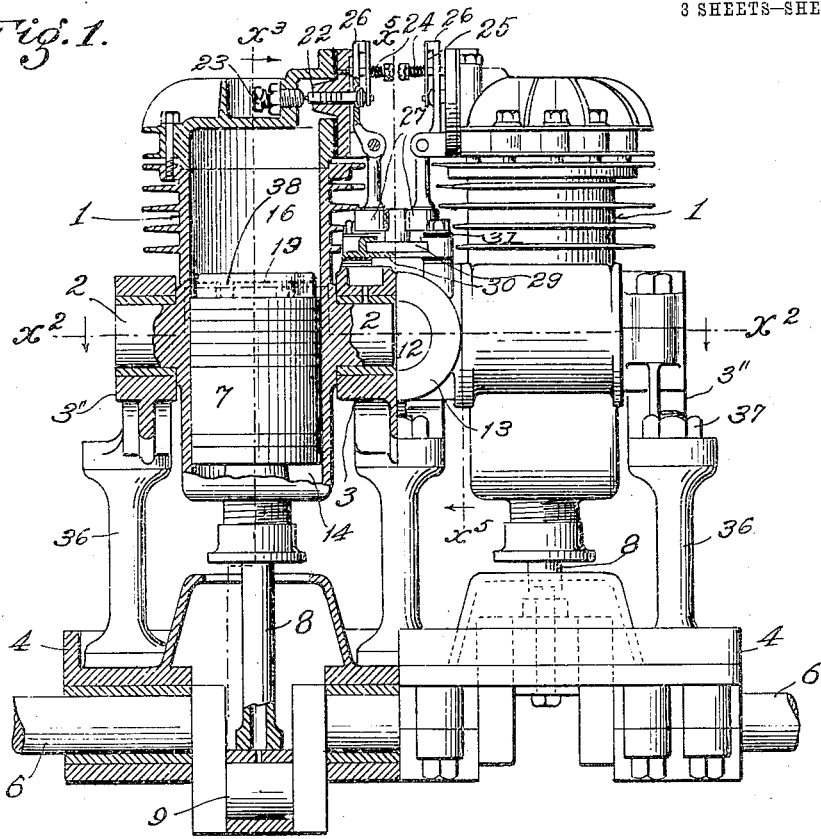
Figure 2:
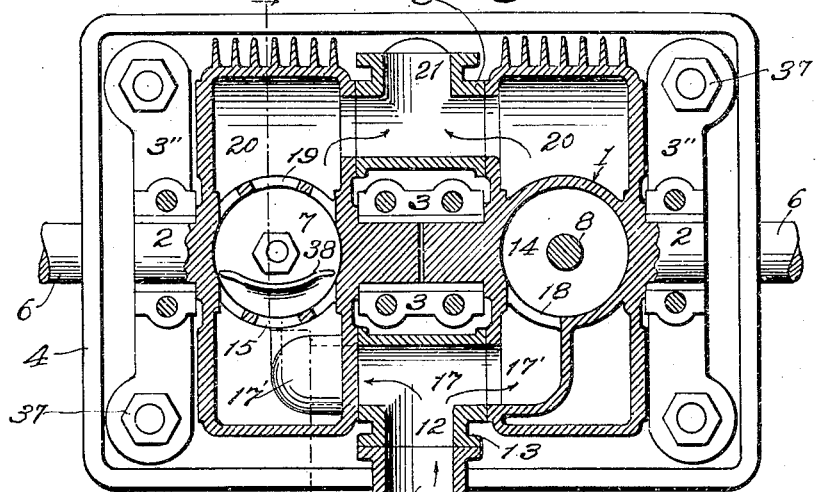

Figure 1 is an elevation of a double engine, embodying this invention; one unit being shown intact and the other in vertical mid-section. Fig. 2 is a plan section on line $x^2$, Figs. 1 and 3. Fig. 3 is a sectional elevation on line $x^3-x^3$, Figs. 1 and 2. Fig. 4 is an enlarged fragmental detail of the central pillow-block and elevation of cylinder showing the arrangement of the sparking device in engines where variable speed is desired. Fig. 5 is a fragmental elevation from the right of Fig. 4 and from the line $x^5$ in Fig. 1, partly in section, showing details of construction. Fig. 6 is a fragmental plan detail, partly in section, looking down upon the top of Fig. 5. Fig. 7 is a view of a modification in which the fuel charge is admitted to the compression chamber through the trunnion.

1 is a cylinder mounted to oscillate on trunnions 2 journaled in pillow-blocks 3, 3″.

4 is the bed-plate or frame which may be fixed to any suitable support as an automobile frame 5.

6 is the crank shaft; 7, the piston, and 8 the rod of said piston connected with the crank 9.

10 is a carbureter supplied with gasolene and air for making an explosive mixture and connected by a pipe 11 with external inlet 12 located in extension 13 of the main pillow-block casting.

14 is a compression chamber extending in the cylinder from one end of the piston around to port 15 into the working chamber 16 of the cylinder.

17 is the fuel inlet located in the pillow-block and communicating through the inlet 17′ and through the inspiration port 18 with the initial compression chamber 14 of the oscillating cylinder.

19 is an exhaust port opening from the working chamber 16 into the exhaust chamber 20 which is continually open to the atmosphere through the exhaust outlet 21 formed of an extension of the pillow-block 3.

22 is a contact-pin held in contact with adjusting screw 23 by spring 24 through the medium of plate 25 which also transmits the tension of spring 24 to lever 26 which carries at its lower end roller 27 adapted to be depressed by engagement with stationary contact arm 28 which may be adjustably mounted upon plate 29 adapted to be moved within guide 30 which is insulated from pillow-block 13 by insulation 31.

32 is a plate which is insulated by insulation 33 from cylinder-head 34 and carries contact pin 22 and its operating lever 26 which is pivoted thereto at 35.

The pillow blocks 3, 3'' are preferably connected with the bed-plate 4 by columns 36 held by nuts 37, thus securing extreme lightness and strength of the frame.

In practical operation the engine will be started by turning the crank-shaft one or two revolutions; the piston 7 advancing from the bottom end of the stroke tends to produce a vacuum which, when the piston has passed inspiration port 18, will draw the gas through the inlets 12 and 17, filling the initial compression chamber 14. On the return stroke, this gas is compressed until the inlet port 15 of the working chamber 16 is uncovered, thereby allowing the compressed gas in chamber 14 to be ejected into chamber 16 and thrown against the deflector 38 to fill the chamber properly and drive out atmospheric air or other prior contents.

Beginning the second revolution, the gas already placed in chamber 16 is compressed until the piston has slightly passed the end of its travel, when the arm 28 will depress the roller 27 thereby, through the medium of the lever 26, breaking the contact between the contact-pin 22 and the adjusting-screw 23, the electric arc here formed firing the gas and causing an explosion by which the piston is then impelled to the opposite end of the stroke, uncovering the exhaust port 19 just previous to opening the inlet-port 17, allowing the bulk of the exhaust gases to escape; the remainder being pushed out by the incoming fuel-gas, and the engine continues to automatically repeat the above process.

The position of the arm 28 with relation to the vertical center line of trunnion and crank-shaft will determine the direction in which the engine will rotate, and by its distance from the center line determine the rate of speed by causing the spark to break before or after the piston has completed full compression.

The arm 28 may be moved to and fro by any suitable means, the eye 29' being provided for attachment of such means, not shown.

In practical construction, an engine of any horse power required may be built up of a number of cylinders grouped in sets of two. In the drawings, one set of such cylinders is shown.

The pillow-block 3 between the cylinders is provided with an inlet-extension 12, in the pillow-block extension, 13 communicating with passage 17 which opens through the pillow-block and communicates at its opposite ends with passages 17' which lead into the initial compression chambers 14 of both cylinders of the pair shown.

40 designates a battery; 41, a spark-coil, and 42 the electrical connection between the battery and the igniter at 43.

44 is the electrical connection between the engine-frame and the battery.

The pillow-blocks 3'' in a two-cylinder engine, support trunnions on opposite sides of the pair of cylinders, but where there are more than two cylinders, double pillow-blocks will be provided for supporting each alternate set of trunnions.

It is to be understood from the foregoing that for stationary constant speed engines the contact-arm can be fixed at the center line permanently. In such case the slide 29 for moving the arm 28 is unnecessary.

I do not limit the construction to the specific forms shown, but may embody the invention in various forms of construction. I do not limit myself to the make-and-break sparking apparatus shown, as it will be evident to anyone skilled in the art that the jump-spark device may be used in lieu thereof.

Assuming that the engine has been running in either direction, the bringing of arm 28 into a position in line with the center line through the crank-shaft and trunnions, will depress roller 27 and thereby separate firing-pin 22 and adjusting screw 23, and will hold them apart and prevent a spark being formed; and the engine will come to rest with its cylinders filled with fuel. The immediate moving of arm 28 in either direction will allow firing-pin 22 to come in contact with screw 23, and upon the immediate return of arm 28 toward the central position, said arm will depress roller 27 and again interrupt the circuit at the point of firing-pin 22, thus igniting the charge and starting the engine; the direction in which the engine will run depending upon the final position of the arm 28.

By this invention all the control of timing the spark, reversing the engine, stopping the engine, and starting the engine is accomplished by a single part; viz., the plate 29, thereby moving arm 28 which, when placed in the central position, will depress roller 27 and open the circuit closed by firing-pin 22, and if the engine be running, will prevent ignition and the engine will come to rest with the cylinders full of fuel, as stated.

To immediately start the engine in either direction, the operator will move arm 28 away from the central position sufficiently far to allow the firing-pin to close the circuit, and immediately returning arm 28 toward the central position, will depress roller 27 and open the circuit at the point of the firing-pin and start the engine in the direction indicated by the side of the center line on which these movements were made by a turn of the shaft.

What I claim is:—

1. In a reversible internal combustion engine, three pillow blocks in a row and forming two cylinder spaces, two pairs of trunnions supported by said pillow blocks, a cylinder carried by each pair of trunnions one in each cylinder space, pistons in the cylinders, a crank shaft, piston rods connecting the pistons to the crank shaft, the inner ends of the cylinders forming compression chambers and the outer ends of the cylinders forming working chambers; a tubular extension upon the center pillow block, a carbureter, a pipe connecting the carbureter to the tubular extension, said tubular extension communicating with the compression chambers, and there being ports leading from the compression chambers into the working chambers, said ports being located substantially at the longitudinal centers of the cylinders and controlled by the pistons.

2. In a reversible internal combustion engine, three pillow blocks in a row and forming two cylinder spaces, two pairs of trunnions supported by said pillow blocks, a cylinder carried by each pair of trunnions one in each cylinder space, pistons in the cylinders, a crank shaft, piston rods connecting the pistons to the crank shaft, the inner ends of the cylinders forming compression chambers and the outer ends of the cylinders forming working chambers; a tubular extension upon the center pillow block, a carbureter, a pipe connecting the carbureter to the tubular extension, said tubular extension communicating with the compression chambers, and there being ports leading from the compression chambers into the working chambers, said ports being located substantially at the longitudinal centers of the cylinders and controlled by the pistons, and said pistons controlling the passages from the carbureter; so that when the fuel is passing to the working chambers under compression the passages to the carbureter are closed.

3. In a reversible internal combustion engine, three pillow blocks in a row and forming two cylinder spaces, two pairs of trunnions supported by said pillow blocks, a cylinder carried by each pair of trunnions one in each cylinder space, pistons in the cylinders, a crank shaft, piston rods connecting the pistons to the crank shaft; the inner ends of the cylinders forming compression chambers and the outer ends of the cylinders forming working chambers; a tubular extension upon the center pillow block, a carbureter, a pipe connecting the carbureter to the tubular extension, said tubular extension communicating with the compression chambers, and there being ports leading from the compression chambers into the working chambers, said ports being located substantially at the longitudinal centers of the cylinders and controlled by the pistons; contact pins in the working chambers, a reversing arm, and contact levers adjustably mounted and engaging the contact pins and the reversing arm; so that by moving the adjustable contact levers by said reversing arm to a position back of the vertical center line of the trunnion the engine may be reversed.

In testimony whereof, I have hereunto set my hand at Los Angeles, California this 9th day of August 1906.

O. H. ENSIGN.

In presence of—
JAMES R. TOWNSEND,
JULIA TOWNSEND.